(12) United States Patent
Nakayama et al.

(10) Patent No.: US 10,850,218 B2
(45) Date of Patent: Dec. 1, 2020

(54) FILTRATION METHOD AND PRODUCTION PROCESS OF CELLULOSE NANOFIBER DISPERSION

(71) Applicant: NIPPON PAPER INDUSTRIES CO., LTD., Tokyo (JP)

(72) Inventors: Takeshi Nakayama, Tokyo (JP); Shinji Sato, Tokyo (JP); Masato Yamaguchi, Tokyo (JP); Satoshi Takaichi, Tokyo (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 28 days.

(21) Appl. No.: 15/772,126

(22) PCT Filed: Nov. 2, 2016

(86) PCT No.: PCT/JP2016/082639
§ 371 (c)(1),
(2) Date: Apr. 30, 2018

(87) PCT Pub. No.: WO2017/078084
PCT Pub. Date: May 11, 2017

(65) Prior Publication Data
US 2018/0318740 A1    Nov. 8, 2018

(30) Foreign Application Priority Data

Nov. 2, 2015   (JP) .................. 2015-215793
Jan. 27, 2016  (JP) .................. 2016-013877

(51) Int. Cl.
*B01D 37/02*    (2006.01)
*B82Y 40/00*    (2011.01)
*C08B 15/08*    (2006.01)
*D21C 9/18*     (2006.01)
*D21H 11/18*    (2006.01)

(52) U.S. Cl.
CPC .............. *B01D 37/02* (2013.01); *B82Y 40/00* (2013.01); *C08B 15/08* (2013.01); *D21C 9/18* (2013.01); *D21H 11/18* (2013.01); *B01D 2239/1216* (2013.01); *B01D 2239/1241* (2013.01); *B01D 2257/80* (2013.01); *C08J 2301/02* (2013.01)

(58) Field of Classification Search
CPC ......... B01D 37/02; B82Y 40/00; C08B 15/08; D21C 9/18; D21H 11/18
See application file for complete search history.

(56) References Cited

U.S. PATENT DOCUMENTS

| | | | |
|---|---|---|---|
| 5,232,595 A | 8/1993 | Meyer | |
| 6,908,496 B2 * | 6/2005 | Halas | ...................... B22F 1/025 |
| | | | 210/639 |
| 2008/0078152 A1 * | 4/2008 | Smithies | ............ B01D 39/1623 |
| | | | 55/524 |
| 2010/0323179 A1 * | 12/2010 | Kim | ...................... D04H 1/4342 |
| | | | 428/220 |
| 2012/0237761 A1 | 9/2012 | Mukai et al. | |
| 2014/0299019 A1 * | 10/2014 | Wu | .......................... D01F 2/28 |
| | | | 106/501.1 |
| 2015/0079866 A1 | 3/2015 | Chao et al. | |
| 2017/0239600 A1 * | 8/2017 | Chen | ...................... B01D 39/02 |
| 2017/0275484 A1 * | 9/2017 | Nishijima | ............... C09D 11/18 |
| 2018/0200655 A1 * | 7/2018 | Nemoto | ............. B01D 46/0001 |
| 2018/0318740 A1 * | 11/2018 | Nakayama | ............. B01D 37/02 |

FOREIGN PATENT DOCUMENTS

| | | |
|---|---|---|
| EP | 3483202 A1 | 5/2019 |
| JP | H04-227009 A | 8/1992 |
| JP | 2007-099586 A | 4/2007 |
| JP | 2008-1728 A | 1/2008 |
| JP | 2008-207366 A | 9/2008 |
| JP | 2009-299043 A | 12/2009 |
| JP | 2010-036132 A | 2/2010 |
| JP | 2010-156068 A | 7/2010 |
| JP | 2011-132501 A | 7/2011 |
| JP | 2012-219380 A | 11/2012 |
| JP | 2013-043963 A | 3/2013 |
| JP | 2014-125691 A | 7/2014 |
| JP | 2014-180777 A | 9/2014 |
| JP | 2015-117340 A | 6/2015 |
| JP | 2015-516515 A | 6/2015 |
| JP | 2015-183020 A | 10/2015 |
| WO | 2013/121083 A2 | 8/2013 |
| WO | 2013/176033 A1 | 11/2013 |
| WO | 2018/012505 A1 | 1/2018 |

OTHER PUBLICATIONS

Japanese Patent Office action dated Aug. 11, 2020 in related JPO application 2017-548818 (Year: 2017).*
Extended European Search Resport for Aplication 16862144.9 dated May 13, 2019, pp. 1-5.
International Search Report for Application No. PCT/JP2016/082639, dated Jan. 10, 2017. 2 pages.

* cited by examiner

*Primary Examiner* — Chester T Barry
(74) *Attorney, Agent, or Firm* — McCarter & English, LLP; Steven G. Davis; Wei Song

(57) ABSTRACT

A cellulose nanofiber with little contaminants and a high transparency is provided. A filtration method of a cellulose nanofiber dispersion including a step of filtering a cellulose nanofiber dispersion under elevated or reduced pressure by at least one of the filtration processes: (A) a filtration process using a filter aid; (B) a filtration process using a filter media selected from the group consisting of a metal porous filter media, an inorganic material porous filter media, and a polymer porous filter media; and (C) a filtration process using both the filter aid and the filter media.

14 Claims, No Drawings

FILTRATION METHOD AND PRODUCTION PROCESS OF CELLULOSE NANOFIBER DISPERSION

CROSS-REFERENCE TO RELATED APPLICATIONS

This application is a U.S. national stage filing, under 35 U.S.C. § 371(c), of International Application No. PCT/JP2016/082639, filed on Nov. 2, 2016, which claims priority to Japanese Patent Application No. 2016-013877, filed on Jan. 27, 2016; and Japanese Patent Application No. 2015-215793, filed on Nov. 2, 2015. The entire contents of each of the aforementioned applications are incorporated herein by reference.

TECHNICAL FIELD

The present invention relates to a filtration method and a production process of a cellulose nanofiber dispersion.

BACKGROUND ART

A cellulose nanofiber obtained from cellulose is a fiber that has a nano level fiber diameter of about 1 to 100 nm. A dispersion of the nanofiber has high transparency. Accordingly, it is expected that the dispersion is applied in usage that require transparency, such as an optical film, a coating agent for films, or conjugation with glass. In general, A cellulose nanofiber is obtained by defibrating a chemically modified cellulose fiber using mechanical shear force (PTL1). With regard to the production process of cellulose nanofiber, various processes are being studied including the process described in PTL1.

The cellulose nanofiber dispersion obtained by the conventional technology contains non-defibrated fiber resulting from incomplete defibration by machine processing and contaminants that entered during the manufacturing steps and could not be removed. Accordingly, the film manufactured from such cellulose nanofiber dispersion had problems, such as poor appearance due to the contaminants, and occurrence of light scattering due to the contaminants. Under such circumstance, there is a need for a cellulose nanofiber dispersion with high transparency. For example, PTL2 discloses that contaminants are removed from a cellulose nanofiber dispersion by subjecting the dispersion to centrifugation.

CITATION LIST

Patent Literature

PTL1: Japanese Publication No. 2008-1728
PTL2: Japanese Publication No. 2014-125691

SUMMARY OF INVENTION

Technical Problem

However, the method of subjecting the cellulose nanofiber dispersion to centrifugation has problems in that only a limited amount can be processed at a time and that the cellulose nanofiber dispersion should be diluted in order to produce an effect.

Solution to Problem

The aforementioned problems may be solved by the present invention described below.

[1] A filtration method of a cellulose nanofiber dispersion comprising a step of filtering a cellulose nanofiber dispersion under elevated or reduced pressure by at least one process selected from:
  (A) a filtration process using a filter aid;
  (B) a filtration process using a filter media selected from the group consisting of a metal porous filter media, an inorganic material porous filter media, or a polymer porous filter media; or
  (C) a filtration process using both the filter aid and the filter media.
[2] The method according to [1], wherein the filter aid comprises a granular material having an average particle size of 1 to 150 µm.
[3] The method according to either [1] or [2], wherein the filter aid comprises diatomaceous earth.
[4] The method according to either [1] or [2], wherein the filter aid comprises powdered cellulose.
[5] The method according to any one of [1] to [4], wherein the metal porous filter media comprises a metal filter having an average pore size of 3 to 20 µm.
[6] The method according to any one of [1] to [4], wherein the polymer porous filter media comprises a polymer porous filter media having an average pore size of 6 µm or more.
[7] The method according to any one of [1] to [4] or [6], wherein the polymer porous filter media comprises a polymer porous filter media having an average pore size of 8 µm or less.
[8] The method according to any one of [1] to [7], comprising depositing two or more precoat layers containing the filter aid.
[9] A process for producing a cellulose nanofiber dispersion comprising the step of filtering according to [1] to [8].

Effect of Invention

The present invention provides a cellulose nanofiber dispersion containing little contaminant and having a high transparency, and a production process of the same.

DESCRIPTION OF EMBODIMENTS

The present invention is described in detail below. The range indicated by "to" in the present invention includes the values on both ends. In other words, "X to Y" includes X and Y. "X or Y" includes one of X and Y, or both.

1. Filtration Method

The filtration method of the present invention includes a step of filtering a cellulose nanofiber dispersion under elevated or reduced pressure.

1-1. Cellulose Nanofiber Dispersion

A cellulose nanofiber dispersion is a liquid in which cellulose nanofibers are dispersed in the dispersion medium. As a dispersion medium, water is preferably used in view of ease of handling. A cellulose nanofiber is a fiber having a number average fiber length of 500 µm or less, and a number average fiber diameter of 20 nm or less. The fiber diameter is preferably 2 to 10 nm. The number average fiber length and the number average fiber diameter may be measured by observing the cellulose nanofiber with an electron microscope or an atomic force microscope. The cellulose nanofiber is prepared from a cellulose material.

(1) Cellulose Material

A cellulose material consists mostly of cellulose and may take various forms. Examples of such materials include pulp (bleached or non-bleached wood pulp, bleached or non-bleached non-wood pulp, pulp derived from plants such as refined linter, jute, Manilla hemp, kenaf, etc.); natural cellulose such as cellulose produced by microorganisms such as *acetobacter*; regenerated cellulose created by dissolving cellulose in some sort of solvent such as cuprammonium solution, morpholine derivative, etc. before subjecting it to spinning; and fine cellulose created by depolymerizing cellulose through subjecting the above cellulose material to mechanical processing, such as hydrolysis, alkali hydrolysis, enzymolysis, blasting, and oscillatory ball milling.

(2) Chemical Modification Treatment

Chemical treatment of the cellulose material promotes defibration of the material by machine processing. The method of the chemical modification treatment is not limited, but includes oxidation, etherification, cationization, and esterification.

i) Oxidation

The cellulose material may be oxidized in water using an oxidizing agent in the presence of an N-oxyl compound and a compound selected from a bromide, an iodide or a mixture thereof to obtain an oxidized cellulose in which carboxyl groups are incorporated into cellulose. Another method of oxidation is that using ozone.

An N-oxyl compound is a compound that may form a nitroxyl radical. Any compound that advances the desired oxidation reaction may be used as the N-oxyl compound of the present invention. The amount of N-oxyl compound to be used is not limited as long as it is a catalytic amount that allows nanofibers to be formed from cellulose. For example, a preferable amount is 0.01 to 10 mmol, more preferably 0.01 to 1 mmol, even more preferably 0.05 to 0.5 mmol, against 1 g in absolute dry weight of the cellulose material.

A bromide is a compound including bromine, of which an example includes an alkali metal bromide which may dissociate in water to form an ion. An iodide is a compound including iodine, of which an example includes an alkali metal iodide. The amount of bromide or iodide to be used may be selected from a range that advances an oxidation reaction. The total amount of a bromide or an iodide is preferably 0.1 to 100 mmol, more preferably 0.1 to 10 mmol, and even more preferably 0.5 to 5 mmol, against 1 g in absolute dry weight of the cellulose material.

As an oxidizing agent, a known material may be used including, for example, halogens, hypohalous acid, halous acids, perhalogen acids or salts thereof, halogen oxides or peroxides. In particular, sodium hypochlorite which is the most commonly used in the current industrial process, low in cost, and low in environmental load is most preferable in terms of cost. The appropriate amount of oxidizing agent to be used is preferably 0.5 to 500 mmol, more preferably 0.5 to 50 mmol, even more preferably 1 to 25 mmol, and most preferably 3 to 10 mmol, against 1 g in absolute dry weight of the cellulose material.

The oxidation reaction of cellulose proceeds efficiently even under a relatively mild condition. Hence, the reaction temperature may be at room temperature of about 15 to 30° C. As the reaction progresses, carboxyl groups are generated in the pulp constituting cellulose causing a decrease in the pH of the reaction solution. For an efficient progress of the oxidation reaction, it is preferable to add an alkaline solution such as a sodium hydroxide solution to maintain the pH of the reaction solution at 9 to 12, and more preferably at about 10 to 11. Water is preferred as the reaction medium for its ease of handling and the low occurrence of a side reaction.

The reaction time in the oxidation reaction may be adjusted as necessary according to the degree of the progress of oxidation, and it is normally 0.5 to 6 h., preferably 1 to 5 h., and more preferably about 2 to 3 h.

The oxidizing agent to be used in the oxidation reaction may be added at one time, or may be added successively. A successive addition of the oxidizing agent allows the carboxyl groups to be inserted into the cellulose material more efficiently than a one-time addition, and advances oxidation of the cellulose material. The end of the oxidation reaction may be confirmed by the color of the oxidizing agent lost, but the reaction may also be ended by decomposing the oxidizing agent with sodium thiosulfate, etc. The dehydration treatment may be performed right after the oxidation reaction ends, but oxidized cellulose tends to degrade easily when the pH is high, so it is preferable to neutralize the oxidized cellulose using hydrochloric acid, etc. before performing the dehydration treatment.

The reaction conditions should preferably be set so that the amount of carboxyl groups in the oxidized cellulose is 0.2 mmol/g or higher against the absolute dry weight of cellulose. The amount of carboxyl groups is more preferably 0.6 mmol/g to 2.0 mmol/g, and even more preferably 1.0 mmol/g to 1.8 mmol/g. The amount of carboxyl groups may be adjusted by the oxidation reaction time, the oxidation reaction temperature, the pH during the oxidation reaction, and the amount of the N-oxyl compound or bromide, iodide or oxidizing agent to be added.

The amount of carboxyl groups in the oxidized cellulose may be measured by the following procedure.

A 0.5 weight % slurry of oxidized cellulose is prepared in an amount of 60 ml, then 0.1 M hydrochloric acid solution is added until the pH is 2.5. Then, a 0.05 N sodium hydroxide solution is added dropwise while the electric conductivity is measured until the pH reaches 11. The following calculation is performed using the amount of sodium hydroxide (a) consumed in the neutralization stage of weak acid, which shows a moderate change in electric conductivity.

Amount of carboxyl groups [mmol/g oxidized cellulose]=$a$ [mL]×0.05/oxidized cellulose weight [g].

ii) Etherification

Examples of etherified cellulose include carboxymethyl cellulose, methyl cellulose, ethyl cellulose, cyanoethyl cellulose, hydroxyethyl cellulose, hydroxypropyl cellulose, ethyl hydroxyethyl cellulose, hydroxypropyl methyl cellulose or salts thereof. A method of carboxymethylation is explained below by way of example.

The cellulose material is used as a starting material, and a solvent of 3 to 20 times the weight of the starting material is used. The solvent is a mixed solvent including lower alcohol, specifically, methanol, ethanol, N-propyl alcohol, isopropyl alcohol, N-butanol, isobutanol, tertiary butanol, alone or in a mixture of two or more types, and water. The proportion of lower alcohol in the mixed solvent is 60 to 95 wt %. Alkali metal hydroxide, specifically, sodium hydroxide or potassium hydroxide, in an amount of 0.5 to 20 folds in mole per a glucose residue of the starting material is used as a mercerization agent. The starting material, the solvent and the mercerization agent are mixed to perform mercerization at a reaction temperature of 0 to 70° C., preferably 10 to 60° C., and a reaction time of 15 min. to 8 h., preferably 30 min. to 7 h. Then, a carboxymethylation agent is added in an amount of 0.05 to 10.0 folds in mole per a glucose residue, and the etherification reaction is performed at a reaction temperature of 30 to 90° C., preferably 40 to 80° C., and a reaction time of 30 min. to 10 h., preferably 1 h. to 4 h.

In the carboxymethylation of cellulose in the present invention, it is preferable for the degree of carboxymethyl substitution per a glucose unit in the cellulose to be 0.01 to 0.50. An incorporation of a carboxymethyl substituent into cellulose causes electric repulsion of cellulose against each other. This facilitates the nano-defibration of cellulose having carboxymethyl substituents therein. When the degree of carboxymethyl substitution per a glucose unit is less than 0.01, the cellulose may not be fully nano-defibrated. On the other hand, when the degree of carboxymethyl substitution per a glucose unit is greater than 0.50, the cellulose will swell or dissolve so that it cannot be obtained in the form of a nanofiber.

The degree of carboxymethyl substitution is measured by the following method.

A sample of about 2.0 g is weighed and put in a 300 mL stoppered Erlenmeyer flask. To the flask is added 100 mL of methanol nitrate (a liquid composed of 100 mL of special grade concentrated nitric acid and 1 L of anhydrous methanol), and the flask is shaken for 3 h. to convert sodium carboxymethyl cellulose (Na-CMC) to carboxymethyl cellulose (H-CMC). 1.5 to 2.0 g of absolute dry H-CMC is weighed and put in a 300 mL stoppered Erlenmeyer flask. H-CMC is wetted by 15 mL of 80% methanol, and 100 mL of 0.1N NaOH is added before shaking the mixture at room temperature for 3 h. Phenolphthalein is used as an indicator to perform back titration of excessive NaOH by using 0.1N $H_2SO_4$. The following formula is used to calculate the degree of carboxymethyl substitution.

Degree of carboxymethyl substitution=[{100×F'−(0.1N $H_2SO_4$(ml))×F}/(absolute dry weight of H-CMC(g))]×0.1=0.162 A/(1−0.058 A)

A: Amount of 1N NaOH required for neutralizing 1 g of H-CMC (ml)
F': Factor of 0.1N $H_2SO_4$
F: Factor of 0.1N NaOH iii) Cationization The cationization of the cellulose material may be performed by a known method without any particular limitation. One example is a method including reacting the cellulose material with cationization agents, such as glycidyltrimethylammonium chloride, 3-chloro-2-hydroxypropyltrialkylammonium hydride or its halohydrin form and an alkali metal hydroxide (sodium hydroxide, potassium hydroxide, etc.), which is a catalyst, under the presence of water or a C1 to C4 alcohol to obtain a cation-modified cellulose. The degree of cation substitution per glucose unit of the cation-modified cellulose obtained by the method may be adjusted by controlling the amount of cationization agent to be reacted, or the compositional ratio of water or the C1 to C4 alcohol.

The degree of cation substitution per glucose unit of the cationized cellulose is defined as the average mole number of the substituent per 1 mole of the anhydrous glucose unit. Specifically, the degree of cation substitution may be obtained by measuring the lignin content of the sample (cation-modified cellulose) using the Klason method, then measuring the nitrogen content (wt %) of the sample using the elementary analysis method, and applying them to the following formula.

Degree of cation substitution=(162×N)/{(1−151.6×400−151.6×N)×(1−0.01×L)}

N: Nitrogen content
L: Lignin content

It is preferable for the degree of cation substitution per glucose unit of the cationized cellulose to be 0.012 to 0.450. Incorporation of cation substituents into cellulose causes electric repulsion of cellulose against each other. This facilitates the nano-defibration of cellulose having cation substituents therein. When the degree of cation substitution per a glucose unit is lower than 0.012, the cellulose may not be fully nano-defibrated. On the other hand, when the degree of cation substitution per a glucose unit is higher than 0.450, the cellulose will swell or dissolve so that it cannot maintain the fiber form, and it becomes impossible to obtain nanofiber.

iv) Esterification

The esterification of the cellulose material may be performed by a known method without any particular limitation. The ester generated by this method is one of monoester, diester, triester, a mixture of monoester and diester, a mixture of monoester and triester, a mixture of diester and triester, and a mixture of monoester, diester and triester. An esterified cellulose includes by way of example cellulose acetate, cellulose propionate, cellulose butyrate, cellulose acetate propionate, cellulose acetate butyrate, cellulose propionate butyrate, cellulose phosphate ester, cellulose sulfate ester, according to the type of acyl group in the ester compound. The degree of substitution is preferably 0.01 to 0.7, more preferably 0.03 to 0.4, and even more preferably 0.05 to 0.30. When the degree of substitution is lower than the aforementioned value, the cellulose will not be fully defibrated, and when the degree of substitution is higher than the aforementioned value, cellulose may dissolve and crystallinity may no longer be maintained.

Phosphorylation is described below as an example of esterification.

Compound A is added to a dispersion of the cellulose-based material (e.g. solid content: 0.1 to 10 wt %) under agitation to incorporate a phosphate group into cellulose. If the compound A is a phosphate-based compound, the amount of compound A to be added in terms of the phosphorus element amount is preferably 0.2 part by weight or higher, more preferably 1 part by weight or higher against 100 parts by weight of the cellulose based material. This enables an improved yield of fine cellulose fibers. The upper limit of the amount of addition is preferably 500 parts by weight or lower, and more preferably 400 parts by weight or lower. This makes it possible to efficiently obtain a yield appropriately corresponding to the amount of compound A that is used. Accordingly, the addition amount is preferably 0.2 to 500 parts by weight, more preferably 1 to 400 parts by weight.

When reacting the compound A with the cellulose-based material, it is possible to further add compound B to the reaction system. For example, compound B may be added to a slurry of the cellulose-based material, an aqueous solution of compound A, or a slurry of the cellulose-based material and compound A.

Although compound B is not particularly limited, it is preferred that the compound B is basic, and more preferred that the compound is a basic nitrogen-containing compound. "Basic" normally means that the aqueous solution of compound B exhibits a color in the range of pink to red in the presence of a phenolphthalein indicator, or that the aqueous solution of compound B has a pH greater than 7. The basic nitrogen-containing compound is not particularly limited as long as it exhibits the effect of the present invention, but a compound having an amino group is preferred. Examples include urea, methylamine, ethylamine, trimethylamine, triethylamine, monoethanolamine, diethanolamine, triethanolamine, pyridine, ethylenediamine, hexamethylenediamine. Urea is preferable among these compounds in terms of low cost and ease of handling. The amount of compound B to be added is preferably 2 to 1000 parts by weight, more preferably 100 to 700 parts by weight against 100 parts by weight of cellulose-based material. The reaction temperature is preferably 0 to 95° C., and more preferably 30 to 90° C. The reaction time is not particularly limited, but is normally about 1 to 600 min., and preferably 30 to 480 min. When the conditions of esterification are in any of these ranges, it prevents excessive esterification and thereby dissolution of cellulose is prevented, and the yield of phosphorylated cellulose is improved.

After compound A is reacted with the cellulose-based material, an esterified cellulose dispersion is normally obtained. An esterified cellulose dispersion is dehydrated as necessary. It is preferable to subject the dispersion to heat treatment after it is dehyderated. This treatment suppresses the hydrolysis of a cellulose-based material. The heating temperature is preferably 100 to 170° C. When water is present in the heat treatment, it is preferable to heat at a temperature of 130° C. or lower (more preferably 110° C. or lower) to remover water, and then heat at 100 to 170° C.

A phosphorylated cellulose has a phosphate substituent incorporated into the cellulose-based material, which causes electric repulsion of cellulose against each other. This facilitates the nano-defibration of the phosphorylated cellulose. It is preferable for the degree of phosphate substitution per a glucose unit in the phosphorylated cellulose to be 0.001 or higher. This allows defibration to be performed to a sufficient level (e.g. nano-defibration). The upper limit is preferably 0.40. This prevents swelling or dissolution of phosphorylated cellulose and prevents a situation in which nanofiber is not obtained. Accordingly, the degree of substitution is preferably 0.001 to 0.40. Phosphorylated cellulose is preferably subjected to a washing treatment, such as washing by cold water after boiling. This allows an efficient defibration.

(3) Defibration

The pulp that had been subjected to the aforementioned treatment is converted to cellulose nanofiber by defibration. Defibration may be performed by using a mixing, agitating, emulsifying, or dispersing machine such as a high shear mixer or a high pressure homogenizer, alone or in combination of two or more, as necessary. In this treatment, the size of pulp (fiber length and fiber diameter) is reduced as the fiber is defibrated to form a single microfibril. In particular, when an ultra high pressure homogenizer that allows a pressure of 100 MPa or higher, preferably 120 MPa or higher, and more preferably 140 MPa or higher is used, shortening of fiber and dispersion proceed efficiently. This is preferable since it allows efficient production of a cellulose nanofiber that has low viscosity when a water-based dispersion is formed.

1-2. Filtration

Filtration of the cellulose nanofiber dispersion under elevated pressure or under reduced pressure is performed. The differential pressure in filtration is preferably 0.01 to 10 MPa. In the past, no idea of filtering a cellulose nanofiber dispersion has been reported, but the inventors found that an advantage may be produced by subjecting the dispersion to filtration. The filtration includes a filter aid filtration using a filter aid and a filter media filtration using a porous filter media. The filtration in the present invention includes the following embodiment.

i) Use of a filter aid;
ii) Use of a filter media selected from the group consisting of a metal porous filter media, an inorganic material porous filter media, and a polymer porous filter media (hereinafter also referred to as "particular filter media");
iii) Combination of use of the filter aid and the particular filter media.

(1) Embodiment i

The filter aid filtration that uses a filter aid is preferable since it can easily resolve the clogging of the filter media due to the filtration treatment by removing a filter layer formed with the filter aid. This enables continuous filtration treatment. Either an inorganic compound or an organic compound may be used as the filter aid, but the filter aid is preferably a granular material. A preferable example includes diatomaceous earth, pearlite, powdered cellulose, activated carbon, etc. Preferable filter aids are described below.

<Diatomaceous Earth>

A diatomaceous earth is a soft rock or soil consisting mainly of the frustules of diatomaceous. It contains silica as the main component, but may also contain alumina, iron oxide or an oxide of alkali metal, in addition to silica. A preferable diatomaceous earth is porous, and has a high void ratio and a cake bulk density of about 0.2 to 0.45. Among the diatomaceous earth, a calcined product or a flux calcined product is preferable, and a diatomaceous earth from fresh water is preferred, but other diatomaceous earth may also be used. Specific examples of diatomaceous earth include Celite (Registered Trademark) of Celite Co. and Celatom (Registered Trademark) of Eagle-Picher Minerals Co.

<Powdered Cellulose>

Powdered cellulose is a rod-shaped particle consisting of a microcrystalline cellulose obtained by removing a non-crystalline portion of wood pulp by acid hydrolysis and then crushing and sieving. The degree of polymerization of cellulose in powdered cellulose is preferably about 100 to 500, and the crystallinity of powdered cellulose obtained by X ray diffraction is preferably 70 to 90%, and the volume average particle size obtained by laser diffraction particle size distribution analyzer is preferably 100 μm or lower, more preferably 50 μm or lower. If the volume average particle size is 100 μm or lower, a cellulose nanofiber dispersion with good flowability is obtained. The powdered cellulose used in the present invention includes by way of example a crystalline powdered cellulose that has a rod-like shape and has a certain particle size distribution, produced by subjecting a refined pulp to acid hydrolysis to obtain an un-decomposed residue, and purifying, drying, crushing, and sieving the residue; KC Flock (Registered Trademark) of Nippon Paper Co.; CEOLUS (Registered Trademark) of Asahi Kasei Chemicals Co.; and Avicel (Registered Trademark) of FMC Co.

The filter aid is preferably a granular material with an average particle size of 1 to 150 μm, more preferably 10 to 75 μm, more preferably 15 to 45 μm, and even more preferably 25 to 45 μm. A smaller average particle size reduces the filtration speed, and a larger particle size will fail to capture contaminants so that the effect of filtration will not be obtained. The average particle size may be measured by a laser diffraction measurement apparatus according to JIS Z8825-1 for a filter aid that is almost spherical, such as diatomaceous earth, or has a rod-like shape, such as a powdered cellulose.

The filtration using a filter aid may be performed by either a precoat filtration in which a layer of the filter aid is formed on a filter media or a body feed filtration in which a pre-mixed filter aid with the cellulose nanofiber dispersion is filtered, but it is more preferable to combine these two methods since the amount to be treated is enhanced and the quality of the filtrate is improved. It is also possible to perform multi-stage filter aid filtration using different types of aids. Further, a single type of filter aid may be used to perform each filtering, or different types of filter aids may be blended for use. When performing the filter aid filtration, it is preferable to use two or more precoat layers and to perform filtration at once. When using two or more precoat layers, each layer may be assigned a different role. For example, when it is difficult to strip off a filter aid after filtration, it is preferable to deposit a filter aid with good stripping property on the inside and to deposit a filter aid with a fine grain size that provides clarity on the outside.

The filter media used in embodiment i is not particularly limited, and may be a known filter media including a paper filter media such as a filter paper, a metal porous filter media, a polymer porous filter media, or an inorganic material porous filter media. An example of metal is stainless, etc.; examples of polymer are cellulose, polypropylene, polyester, nylon, cotton, polytetrafluoroethylene, polyphenylene sulfide, etc.; and examples of inorganic materials include glass and ceramic, etc. Forms of porous filter media include a porous filter, a membrane filter, a filter cloth, a filter composed by sintering metal powder, and a slit-shaped filter. In this embodiment, it is possible to select either a method of using a low cost, general purpose filter such as a paper filter and a method of using a durable filter repetitively by washing. A filter media and its support made of a pressure resistant material are advantageously used since it allows an efficient filtration of a cellulose nanofiber dispersion with high viscosity.

The preferable average pore size of a filter media when using a filter aid is preferably 0.1 to 200 μm, more preferably 0.05 to 150 μm, even more preferably 1 to 100 μm. A smaller average pore size fails to provide a sufficient filtration speed, and a larger average pore size makes it difficult to capture the filter aid so it becomes difficult to obtain a filtration effect.

(2) Embodiment ii

The present embodiment uses a filter media selected from the group consisting of a metal porous filter media, an inorganic material porous filter media, and a polymer porous filter media. Among these, a metal filter which is a metal porous filter media or a membrane filter which is a polymer porous filter media is preferred, and a metal filter is more preferred. The present embodiment may capture contaminants using only the filter media, so it can achieve efficient filtration without using a filter aid. The optimum pore size differs by the type of material in view of the capacity to remove contaminants and pressure resistance. In a metal or inorganic material porous filter media, the lower limit of the average pore size is preferably 3 μm or higher and the upper limit is preferably 20 μm or lower. In a polymer porous filter media, the average pore size is preferably 5 μm or higher, more preferably 6 μm or higher, and even more preferably 7 μm or higher and the upper limit is preferably 8 μm or lower.

(3) Embodiment iii

The present embodiment is capable of achieving a more efficient filtration since it uses combination of the filter aid and the particular filter media. In the present embodiment, the filter aid and the particular filter media may be combined for use in a single filtration treatment. Alternatively, a filtration using the filter aid and a filtration using the particular filter media may be individually performed in sequence. The order of the filtration process may be selected as necessary.

(4) Filtration Condition, Etc

The filtration apparatus must be usable under increased or reduced pressure. By performing filtration under elevated or reduced pressure, a sufficient filtration throughput is obtained even using a high concentration or viscosity of cellulose nanofiber dispersion. The apparatus may include a Nutsche type, a candle type, a leaf disk type, a drum type, a filter press type, a belt type, etc.

The filtration throughput is preferably 10 L/m$^2$ or higher per 1 h., and more preferably 100 L/m$^2$ or higher.

2. Cellulose Nanofiber

The cellulose nanofiber dispersion obtained by performing the aforementioned filtration step has excellent transparency. The transparency of the cellulose nanofiber dispersion may be obtained by measuring the transmittance of light with a wavelength of 660 nm using a spectrophotometer. In the present invention, the light transmittance (wavelength 660 nm) of the aqueous dispersion of cellulose nanofiber at a concentration of 1.0% (w/v) is preferably 85% or higher, more preferably 90% or higher, and even more preferably 95% or higher.

The dispersion may be dried or solidified to produce a film product of cellulose nanofiber with high transparency. Further, a sheet or a mold product containing cellulose nanofiber may be obtained by using the dispersion.

EXAMPLES

The present invention is described in more detail based on Examples, but is not limited to Examples shown below.

Example 1

<Oxidation of Pulp>

A bleached, unbeaten softwood pulp (Nippon Paper Co.) in an amount of 5 g (absolute dry weight) was added to 500 mL of an aqueous solution that dissolves 78 mg (0.5 mmol) of TEMPO (Tokyo Chemical Industry Co.) and 756 mg (7.35 mmol) of sodium bromide (Wako Pure Chemical Industries, Ltd.), and the mixture was agitated until the pulp was evenly dispersed. To this mixture was added 2.3 mmol of sodium hypochlorite (Wako Pure Chemical Industries, Ltd.) in a form of aqueous solution, then sodium hypochlorite (Wako Pure Chemical Industries, Ltd.) was gradually added using a liquid feeding pump so that the addition speed was 0.23 mmol/min. per 1 g of pulp, to oxidize pulp. The addition was continued until the total amount of sodium hypochlorite that was added became 22.5 mmol. Although pH in the system decreases during the reaction, a 3N sodium hydroxide solution was gradually added to adjust the pH to 10. The time from when the addition of the sodium hydroxide solution was begun (i.e. the point when the oxidation reaction started and a decrease in pH was witnessed) until it ended (i.e. the point when the oxidation reaction ended and a decrease in pH was no longer witnessed) was considered as the reaction time. After the reaction solution was neutralized with hydrochloric acid to a neutral state, the solution after reaction was filtered with a glass filter and washed fully with water to obtain an oxidized pulp.

<Measurement of the Amount of Carboxyl Groups in the Oxidized Pulp>

The amount of carboxyl groups in the oxidized pulp was measured by the following method.

A 0.5 wt % slurry of the oxidized pulp was prepared in an amount of 60 mL, then 0.1M hydrochloric acid solution was added until the pH was 2.5. Then, a 0.05N sodium hydroxide solution was added dropwise while electric conductivity was measured until the pH reached 11. The following calculation was performed using the amount of sodium hydroxide (a) consumed in the neutralization stage of weak acid, which shows a moderate change in the electric conductivity.

Amount of carboxyl groups [mmol/g oxidized pulp]=$a$ [mL]×0.05/oxidized pulp weight [g].

The amount of carboxyl groups in the oxidized pulp obtained by this measurement was 1.60 mmol/g.

<Defibration of Oxidized Pulp and Formulation of Dispersion>

500 mL of the slurry of oxidized pulp (concentration 1% (w/v)) that underwent the aforementioned oxidation was processed five times in an ultra high pressure homogenizer (20° C., 140 MPa). Thus, a transparent gel-like cellulose nanofiber dispersion was obtained.

<Transparency Measurement>

The cellulose nanofiber dispersion obtained above was degassed by an ultrasonic device, and then, transparency was obtained by measuring light transmittance (%) at a wavelength of 660 nm using an ultraviolet and visible spectrophotometer (UV-1800, Shimadzu Corp.). The transparency obtained by the measurement was 89%.

<Filtration Treatment>

A filter paper (Azumi Filter-Paper Co., Ltd., Axtar B508-10P) was set on a stainless holder with a tank (KST-47, Advantec, filtration area 12.5 cm$^2$). Diatomaceous earth (Showa Chemical Industry Co., Ltd., Radiolite 700, average particle size 29.6 μm) in an amount of 1.25 g as a filter aid was dispersed in 1 L of water, and then fed onto a filter paper for precoating to create a filter aid layer. Then, 5 g of diatomaceous earth was mixed against 5 L of cellulose nanofiber dispersion for performing body feed filtration before filling it in a pressurized tank. The dispersion was pressurized to 0.35 MPa with nitrogen gas and filtered to obtain a filtrate of 1,274 L/m$^2$ after 20 min. The transparency of the filtrate was 95%. The filter aid could be stripped from the filter paper after filtration.

Example 2

Filtration was performed similarly to Example 1 other than using Radiolite 900 (Showa Chemical Industry Co., Ltd., average particle size 40.6 μm) as diatomaceous earth. A filtrate of 2258 L/m$^2$ was obtained after 20 min. The transparency of the filtrate was 93%. The stripping property of the filter aid from the filter paper after filtration was good.

Example 3

Filtration was performed similarly to Example 1 other than using Radiolite 500 (Showa Chemical Industry Co., Ltd., average particle size 35.1 μm) as diatomaceous earth. A filtrate of 577 L/m$^2$ was obtained after 20 min. The transparency of the filtrate was 94%. It was possible to strip the filter aid from the filter paper after filtration.

Example 4

Filtration was performed similarly to Example 1 other than not adding diatomaceous earth to the cellulose nanofiber dispersion. Filtration was clogged after 5 min., but a filtrate of 590 L/m$^2$ was obtained. The transparency of the filtrate was 95%. It was possible to strip the filter aid from the filter paper after filtration.

Example 5

Filtration was performed similarly to Example 2 other than not adding diatomaceous earth to the cellulose nanofiber dispersion. Filtration was clogged after 5 min., but a filtrate of 1371 L/m$^2$ was obtained. The transparency of the filtrate was 93%. The stripping property of the filter aid from the filter paper after filtration was good.

Example 6

Filtration was performed similarly to Example 4 other than using Radiolite 1500H (Showa Chemical Industry Co., Ltd., average particle size 19.4 μm) as diatomaceous earth. Filtration was clogged after 5 min., but a filtrate of 417 L/m$^2$ was obtained. The transparency of the filtrate was 95%. It was possible to strip the filter aid from the filter paper after filtration.

Example 7

Filtration was performed similarly to Example 3 other than not adding diatomaceous earth to the cellulose nanofiber dispersion. Filtration was clogged after 5 min., but a filtrate of 334 L/m$^2$ was obtained. The transparency of the filtrate was 94%. It was possible to strip the filter aid from the filter paper after filtration.

Example 8

Filtration was performed similarly to Example 4 other than using Radiolite 3000 (Showa Chemical Industry Co., Ltd., average particle size 74.9 μm) as diatomaceous earth. Filtration was clogged after 5 min., but a filtrate of 4938 L/m$^2$ was obtained. The transparency of the filtrate was 91%. The stripping property of the filter aid from the filter paper after filtration was good.

Example 9

Filtration was performed similarly to Example 4 other than using Silica 600H (Chuo Silica Co., Ltd., average particle size 39.7 μm) as diatomaceous earth. Filtration was clogged after 5 min., but a filtrate of 268 L/m$^2$ was obtained. The transparency of the filtrate was 96%. It was possible to strip the filter aid from the filter paper after filtration.

Example 10

Filtration was performed similarly to Example 4 other than changing the filter aid to powdered cellulose (Nippon Paper Co., KC Flock W-300G, average particle size 28 μm). Filtration was clogged after 5 min., but a filtrate of 151 L/m$^2$ was obtained. The transparency of the filtrate was 96%. It was possible to strip the filter aid from the filter paper after filtration.

Example 11

Filtration was performed similarly to Example 4 other than changing the filter aid to powdered cellulose (Nippon Paper Co., KC Flock W-50S, average particle size 50 μm).

Filtration was clogged after 5 min., but a filtrate of 203 L/m² was obtained. The transparency of the filtrate was 94%. It was possible to strip the filter aid from the filter paper after filtration.

Example 12

After using 1.25 g of Radiolite 3000 (Showa Chemical Industry Co., Ltd., average particle size 74.9 µm) as diatomaceous earth to form a first layer of precoating, 11.25 g of Radiolite 700 (Showa Chemical Industry Co., Ltd., average particle size 29.6 µm) was used to form a second layer of precoating. The subsequent steps were performed similarly to Example 1. In order to perform body feed filtration, 5 g of Radiolite 700 was mixed against 5 L of cellulose nanofiber dispersion to perform filtration. A filtrate of 1670 L/m² was obtained after 20 min. The transparency of the filtrate was 94%. The stripping property of the filter aid from the filter paper after filtration was good.

Example 13

After using 1.25 g of Radiolite 900 (Showa Chemical Industry Co., Ltd., average particle size 40.6 µm) as diatomaceous earth to form a first layer of precoating, 11.25 g of Radiolite 1500H (Showa Chemical Industry Co., Ltd., average particle size 19.4 µm) was used to form a second layer of precoating. The subsequent steps were performed similarly to Example 1. In order to perform body feed filtration, 5 g of Radiolite 1500H was mixed against 5 L of cellulose nanofiber dispersion to perform filtration. A filtrate of 534 L/m² was obtained after 20 min. The transparency of the filtrate was 95%. The stripping property of the filter aid from the filter paper after filtration was good.

Comparative Example 1

A cellulose nanofiber dispersion was obtained similarly to Example 1 except that filtration was not performed. The transparency of the cellulose nanofiber dispersion was 89%.

The results of Examples 1 to 13 and Comparative Example 1 are shown in Table 1.

Example 14

<Production of Carboxymethylated Cellulose>

To an agitator that can mix pulp, 200 g in dry weight of pulp (NBKP, Nippon Paper Co.), and 440 g in dry weight of sodium hydroxide were added, and the concentration of pulp solid was adjusted to 15% by adding water. Subsequently, the mixture was agitated at 30° C. for 30 min., after which the temperature was raised to 70° C., and 585 g (converted to active ingredient) of sodium monochloroacetate was added. After 1 h. of reaction, the reactant was taken out, neutralized, and washed to obtain a carboxymethylated cellulose with a degree of carboxymethyl substitution of 0.24 per glucose unit.

A slurry of 1.0% (w/v) was formulated by adding water to the carboxymethylated cellulose, then the slurry was processed five times in an ultra high pressure homogenizer (20° C., 140 MPa), and a cellulose nanofiber dispersion was obtained. The transparency of the obtained cellulose nanofiber dispersion was 67%.

<Filtration Treatment>

Filtration was performed similarly to Example 4 other than using Radiolite 3000 (Showa Chemical Industry Co., Ltd., average particle size 74.9 µm) as diatomaceous earth. A filtrate of 300 L/m² was obtained after 20 min. The transparency of the filtrate was 85%. The stripping property of the filter aid from the filter paper after filtration was good.

Comparative Example 2

A cellulose nanofiber dispersion was obtained similarly to Example 14 except that filtration was not performed. The transparency of the cellulose nanofiber dispersion was 67%.

The results of Example 14 and Comparative Example 2 are shown in Table 2.

Example 15

<Production of Cation-Modified Cellulose>

To a pulper that can agitate pulp, 200 g in dry weight of pulp (LBKP, Nippon Paper Co.), and 24 g in dry weight of sodium hydroxide were added, and the concentration of pulp solid was adjusted to 15% by adding water. Subsequently, the mixture was agitated at 30° C. for 30 min., after which the temperature was raised to 70° C., and 190 g (converted to active ingredient) of 3-chloro-2-hydroxypropyl trimethyl ammonium chloride was added as a cationization agent. After 1 h. of reaction, the reactant was taken out, neutralized, and washed to obtain a cation-modified cellulose.

<Measurement Method of Degree of Cation Substitution Per Glucose Unit>

The degree of cation substitution was obtained by measuring the lignin content of the sample (cation-modified cellulose) using the Klason method, then measuring the nitrogen content (wt %) of the sample using the elementary analysis method using a Total Nitrogen Analyzer TN-10 (Mitsubishi Chemical), and applying the values to the following formula. The degree of substitution is shown by an average mole number of the substituent per 1 mole of anhydrous glucose unit.

Degree of cation substitution=$(162 \times N)/\{(1-151.6 \times 400-151.6 \times N) \times (1-0.01 \times L)\}$ N: Nitrogen content L: Lignin content 25 wt % of a cation-modified cellulose with a degree of cation substitution of 0.043 per a glucose unit was obtained. Then, the cation-modified pulp was adjusted to a solid concentration of 0.5%, and processed three times by a high pressure homogenizer at a temperature of 20° C. and a pressure of 140 MPa to obtain a cellulose dispersion. The transparency of the dispersion was 6%.

<Filtration Treatment>

Filtration was performed similarly to Example 4 other than using Radiolite 3000 (Showa Chemical Industry Co., Ltd., average particle size 74.9 µm) as diatomaceous earth. A filtrate of 12 L/m² was obtained after 20 min. The transparency of the filtrate was 65%. The stripping property of the filter aid from the filter paper after filtration was good.

Comparative Example 3

A cellulose nanofiber dispersion was obtained similarly to Example 15 except that filtration was not performed. The transparency of the cellulose nanofiber dispersion was 6%.

The results of Example 15 and Comparative Example 3 are shown in Table 3.

Example 16

A metal filter (average pore size 5 µm) was set on a filter holder to prepare a filtration apparatus. The cellulose nanofiber dispersion was fed to the apparatus using a pump to perform filtration. The pressure rose to 0.4 MPa after 5 min. of filtration time, at which time filtration was ended. 403 L/m² of filtrate was obtained. The transparency of the filtrate was 95%.

Example 17

Filtration was performed similarly to Example 16 other than changing the average pore size of the metal filter to 3 µm. The pressure rose to 0.4 MPa after 3 min. of filtration time, at which time filtration was ended. 164 L/m² of a filtrate was obtained. The transparency of the filtrate was 95%.

Example 18

Filtration was performed similarly to Example 16 other than changing the average pore size of the metal filter to 20 µm. The pressure rose to 0.4 MPa after 13 min. of filtration time, at which time filtration was ended. 2020 L/m² of a filtrate was obtained. The transparency of the filtrate was 90%.

Example 19

A membrane filter (Millipore, cellulose ester membrane filter, average pore size 8 µm) was set on a stainless holder with a tank to perform filtration similarly to Example 16. Filtration was clogged after 5 min., but a filtrate of 79 L/m² was obtained. The transparency of the filtrate was 98%.

Example 20

After setting the metal filter used in Example 16 on a filter holder, diatomaceous earth (Showa Chemical Industry Co., Ltd., Radiolite 3000, average particle size 74.9 µm) as a filter aid, diluted in pure water, was delivered for precoating. Then, the cellulose nanofiber dispersion was delivered to the filtration apparatus using a pump similarly to Example 1 to perform filtration. The pressure rose to 0.4 MPa after 5 min. of filtration time, at which time filtration was ended. 685 L/m² of a filtrate was obtained. The transparency of the filtrate was 96%. The stripping property of the filter aid from the filter paper after filtration was good.

Example 21

Filtration was performed similarly to Example 16 other than using a nylon mesh (HC-5, average pore size 5 µm). The transparency of the obtained filtrate was 89%.

Comparative Example 4

Filtration was performed similarly to Example 16 other than changing to a membrane filter with an average pore size of 3 µm. The membrane was torn, and the filtrate treatment could not be performed.

The results of Examples 16 to 21 and Comparative Example 4 are shown in Table 3.

TABLE 1

| | Chemical Modification | Filtration Process | Filter Aid Type | Filter Aid Product Name | Filtration Treatment Transparency (%) | Filtration Treatment Throughput (L/m²) |
|---|---|---|---|---|---|---|
| Example 1 | Oxidation | Filter aid filtration (precoat/body feed) | Diatomaceous earth | Radiolite 700 | 95 | 1,274 |
| Example 2 | Oxidation | Filter aid filtration (precoat/body feed) | Diatomaceous earth | Radiolite 900 | 93 | 2,258 |
| Example 3 | Oxidation | Filter aid filtration (precoat/body feed) | Diatomaceous earth | Radiolite 500 | 94 | 577 |
| Example 4 | Oxidation | Filter aid filtration (precoat) | Diatomaceous earth | Radiolite 700 | 95 | 590 |
| Example 5 | Oxidation | Filter aid filtration (precoat) | Diatomaceous earth | Radiolite 900 | 93 | 1,371 |
| Example 6 | Oxidation | Filter aid filtration (precoat) | Diatomaceous earth | Radiolite 1500H | 95 | 417 |
| Example 7 | Oxidation | Filter aid filtration (precoat) | Diatomaceous earth | Radiolite 500 | 94 | 334 |
| Example 8 | Oxidation | Filter aid filtration (precoat) | Diatomaceous earth | Radiolite 3000 | 91 | 4,938 |
| Example 9 | Oxidation | Filter aid filtration (precoat) | Diatomaceous earth | Silica 600H | 96 | 268 |
| Example 10 | Oxidation | Filter aid filtration (precoat) | Powdered cellulose | KC Flok W-300G | 96 | 151 |
| Example 11 | Oxidation | Filter aid filtration (precoat) | Powdered cellulose | KC Flok W-505 | 94 | 203 |

TABLE 1-continued

|  | Chemical Modification | Filtration Process | Filter Aid Type | Filter Aid Product Name | Filtration Treatment Transparency (%) | Filtration Treatment Throughput (L/m$^2$) |
|---|---|---|---|---|---|---|
| Example 12 | Oxidation | Filter aid filtration (2 layer precoat/body feed) | Diatomaceous earth | Radiolite 3000/700 | 94 | 1,670 |
| Example 13 | Oxidation | Filter aid filtration (2 layer precoat/body feed) | Diatomaceous earth | Radiolite 900/1500H | 95 | 534 |
| Comp. Example 1 | Oxidation | — | — | — | 89* | — |

*Not filtered

TABLE 2

|  | Chemical Modification | Filtration Process | Filter Aid Type | Filter Aid Product Name | Filtration Treatment Transparency (%) | Filtration Treatment Throughput (L/m$^2$) |
|---|---|---|---|---|---|---|
| Example 14 | Carboxymethylation | Filter aid filtration (precoat) | Diatomaceous earth | Radiolite 3000 | 85 | 300 |
| Comp. Example 2 | Carboxymethylation | — | — | — | 67* | — |

*Not filtered

TABLE 3

|  | Chemical Modification | Filtration Process | Filter Aid Type | Filter Aid Product Name | Filtration Treatment Transparency (%) | Filtration Treatment Throughput (L/m$^2$) |
|---|---|---|---|---|---|---|
| Example 15 | Cationization | Filter aid filtration (precoat) | Diatomaceous earth | Radiolite 3000 | 65 | 12 |
| Comp. Example 3 | Cationization | — | — | — | 6* | — |

*Not filtered

TABLE 4

|  | Chemical Modification | Filter Aid Type | Filter Aid Product Name | Average Pore Size (μm) | Filtration Treatment Transparency (%) | Filtration Treatment Throughput (L/m$^2$) |
|---|---|---|---|---|---|---|
| Example 16 | Oxidation | Metal filter | Metal fiber | 5 | 95 | 403 |
| Example 17 | Oxidation | Metal filter | Metal fiber | 3 | 95 | 164 |
| Example 18 | Oxidation | Metal filter | Metal fiber | 20 | 90 | 2,020 |
| Example 19 | Oxidation | Membrane filter | Cellulose ester membrane filter | 8 | 98 | 79 |
| Example 20* | Oxidation | Metal filter | Metal fiber | 5 | 96 | 685 |
| Example 21 | Oxidation | Nylon mesh | HC-5 | 5 | 89 | — |
| Comp. Example 1 | Oxidation | — | — | — | 89** | — |

TABLE 4-continued

| | Chemical Modification | Filter Aid Type | Product Name | Average Pore Size (μm) | Transparency (%) | Throughput (L/m²) |
|---|---|---|---|---|---|---|
| Comp. Example 4 | Oxidation | Membrane filter | Cellulose ester membrane filter | 3 | 89 | — |

*Combine with preacoat using filter aid (Diatomaceous earth Radiolite 3000)
**Not filtered It is apparent that the filtration method of the present invention can increase the throughput and provide a cellulose nanofiber dispersion with high transparency.

The invention claimed is:

1. A filtration method of a cellulose nanofiber dispersion comprising a step of filtering a cellulose nanofiber dispersion under elevated or reduced pressure by at least one process selected from:
   (A) a filtration process using a filter aid;
   (B) a filtration process using a filter media selected from the group consisting of a metal porous filter media, an inorganic material porous filter media, or a polymer porous filter media; or
   (C) a filtration process using both the filter aid and the filter media, to produce a cellulose nanofiber dispersion from which contaminants are removed,
   wherein the filter aid comprises a granular material having an average particle size of 1 to 150 μm.

2. The method according to claim 1, wherein the filter aid comprises diatomaceous earth.

3. The method according to claim 1, wherein the filter aid comprises powdered cellulose.

4. The method according to claim 1, wherein the metal porous filter media comprises a metal filter having an average pore size of 3 to 20 μm.

5. The method according to claim 1, wherein the polymer porous filter media comprises a polymer porous filter media having an average pore size of 6 μm or more.

6. The method according to claim 1, wherein the polymer porous filter media comprises a polymer porous filter media having an average pore size of 8 μm or less.

7. The method according to claim 1, comprising depositing two or more precoat layers containing the filter aid.

8. A process for producing a cellulose nanofiber dispersion comprising the step of filtering according to claim 1.

9. A filtration method of a cellulose nanofiber dispersion comprising a step of filtering a cellulose nanofiber dispersion under elevated or reduced pressure by at least one process selected from:
   (A) a filtration process using a filter aid;
   (B) a filtration process using a filter media selected from the group consisting of a metal porous filter media, an inorganic material porous filter media, or a polymer porous filter media; or
   (C) a filtration process using both the filter aid and the filter media, to produce a cellulose nanofiber dispersion from which contaminants are removed,
   wherein the filter aid comprises diatomaceous earth or powdered cellulose.

10. The method according to claim 9, wherein the metal porous filter media comprises a metal filter having an average pore size of 3 to 20 μm.

11. The method according to claim 9, wherein the polymer porous filter media comprises a polymer porous filter media having an average pore size of 6 μm or more.

12. The method according to claim 9, wherein the polymer porous filter media comprises a polymer porous filter media having an average pore size of 8 μm or less.

13. The method according to claim 9, comprising depositing two or more precoat layers containing the filter aid.

14. A process for producing a cellulose nanofiber dispersion comprising the step of filtering according to claim 9.

* * * * *